Oct. 22, 1963    F. E. BACHMAN    3,107,754
POWER BEAM TREAD BRAKE ARRANGEMENT
Filed Oct. 19, 1961    5 Sheets-Sheet 1

INVENTOR.
Fred E. Bachman
BY Walter J. Schlegel, Jr.
Atty.

Witness:
C H Bassett

Oct. 22, 1963  F. E. BACHMAN  3,107,754
POWER BEAM TREAD BRAKE ARRANGEMENT
Filed Oct. 19, 1961  5 Sheets-Sheet 2
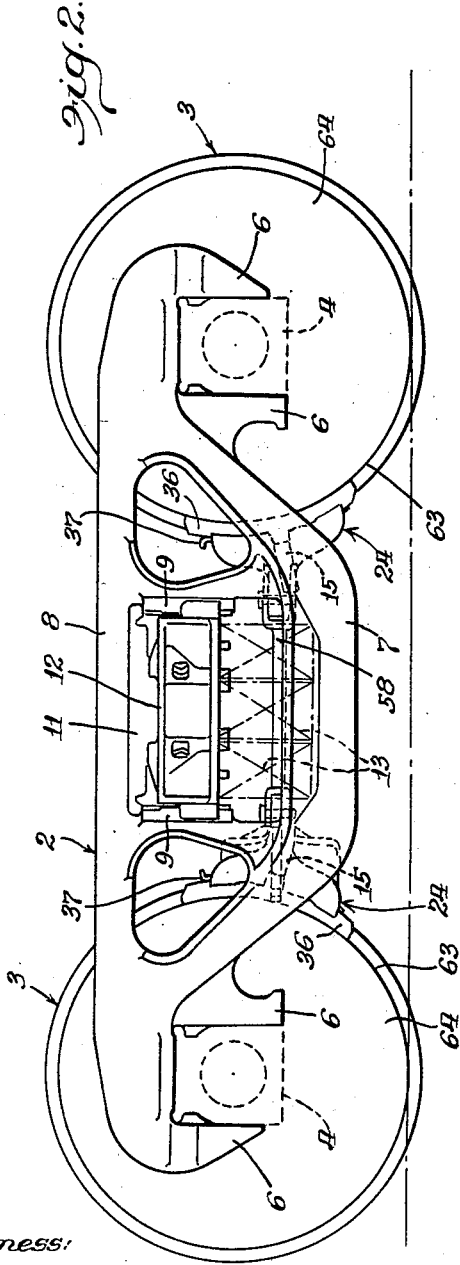
INVENTOR.
Fred E. Bachman
BY Walter S. Schlegel Jr.
Atty.
Witness:
C. H. Bassett

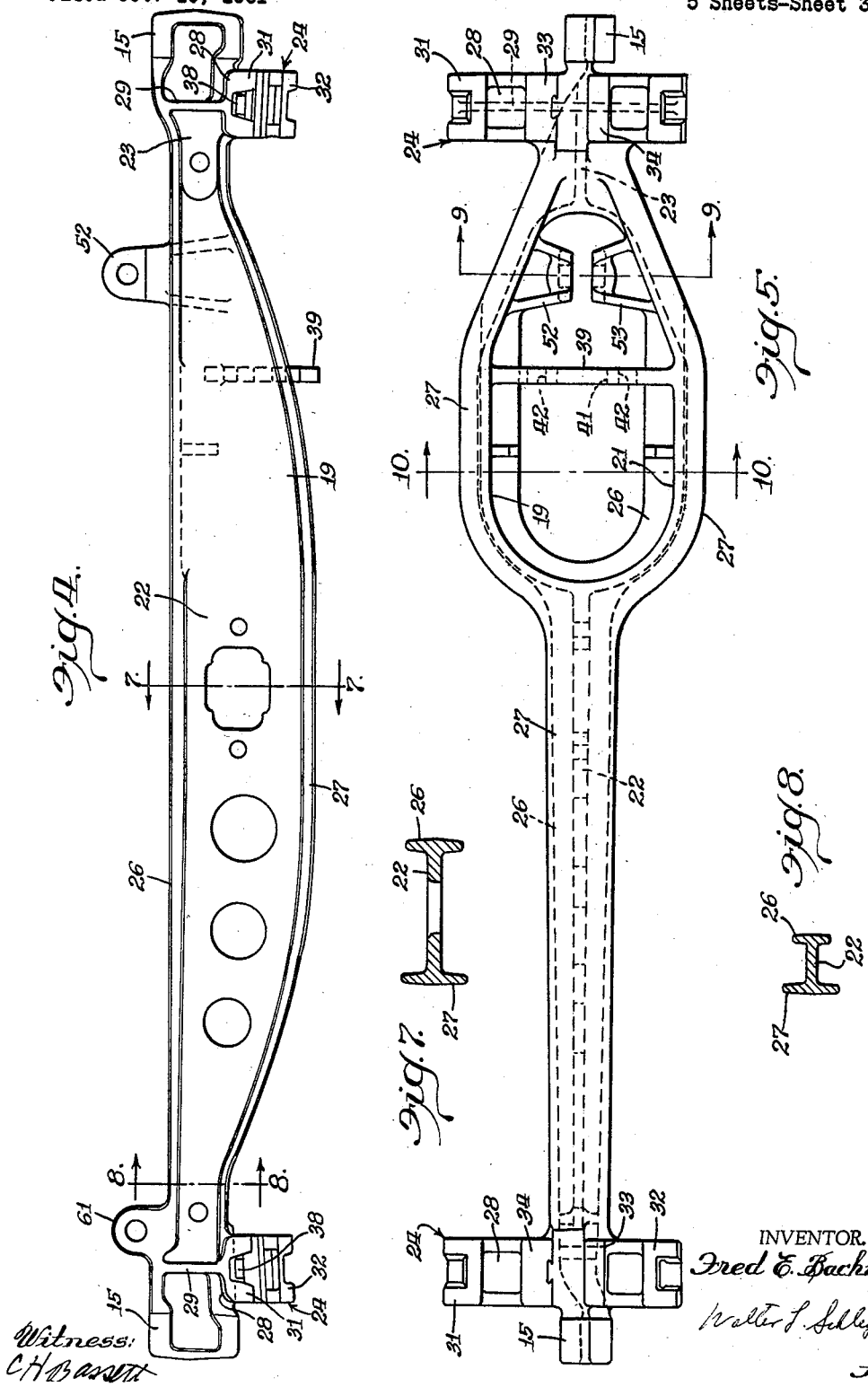

Oct. 22, 1963  F. E. BACHMAN  3,107,754
POWER BEAM TREAD BRAKE ARRANGEMENT
Filed Oct. 19, 1961  5 Sheets-Sheet 4
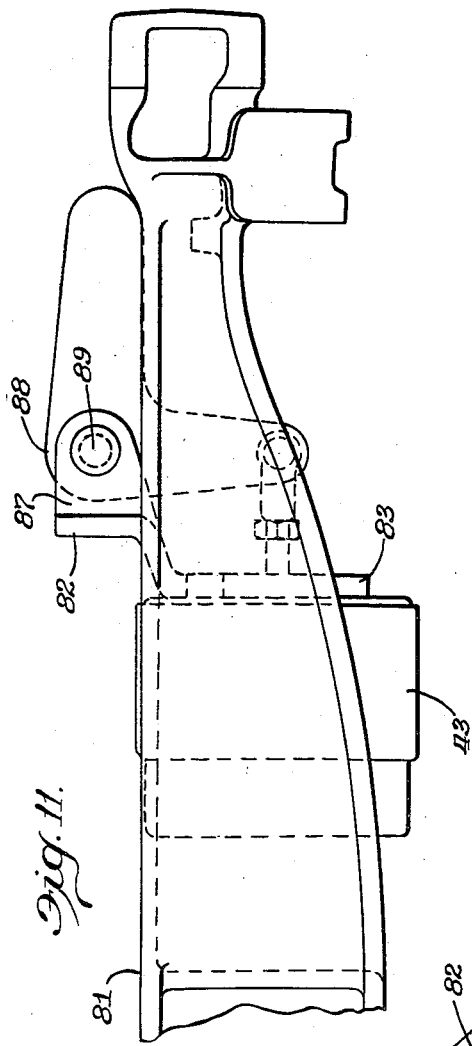
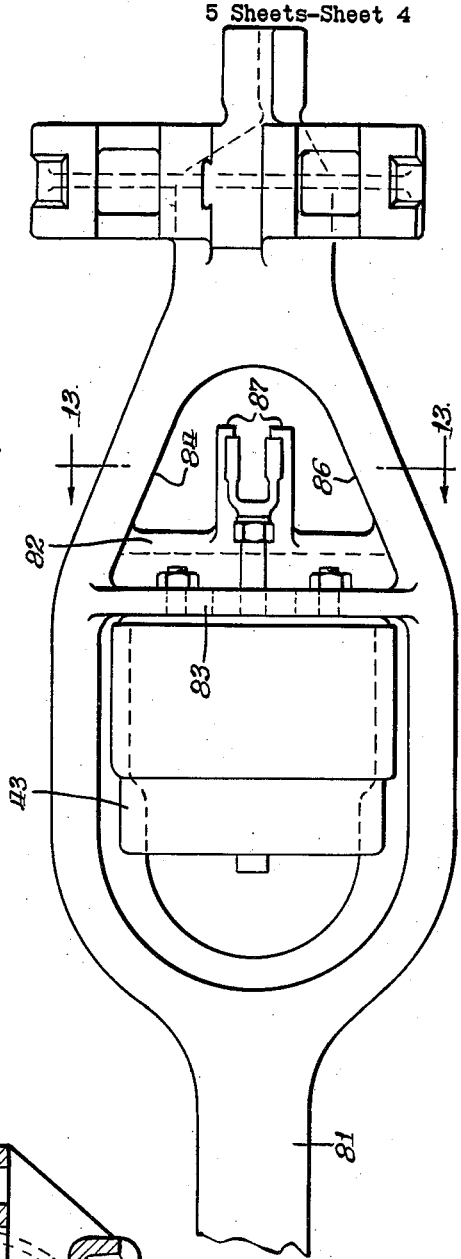
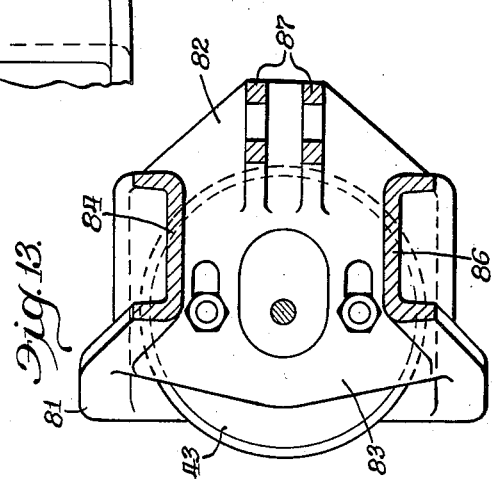
INVENTOR.
Fred E. Bachman
Walter J. Schlegel, Jr.
Atty.
Witness:
C. H. Bassett

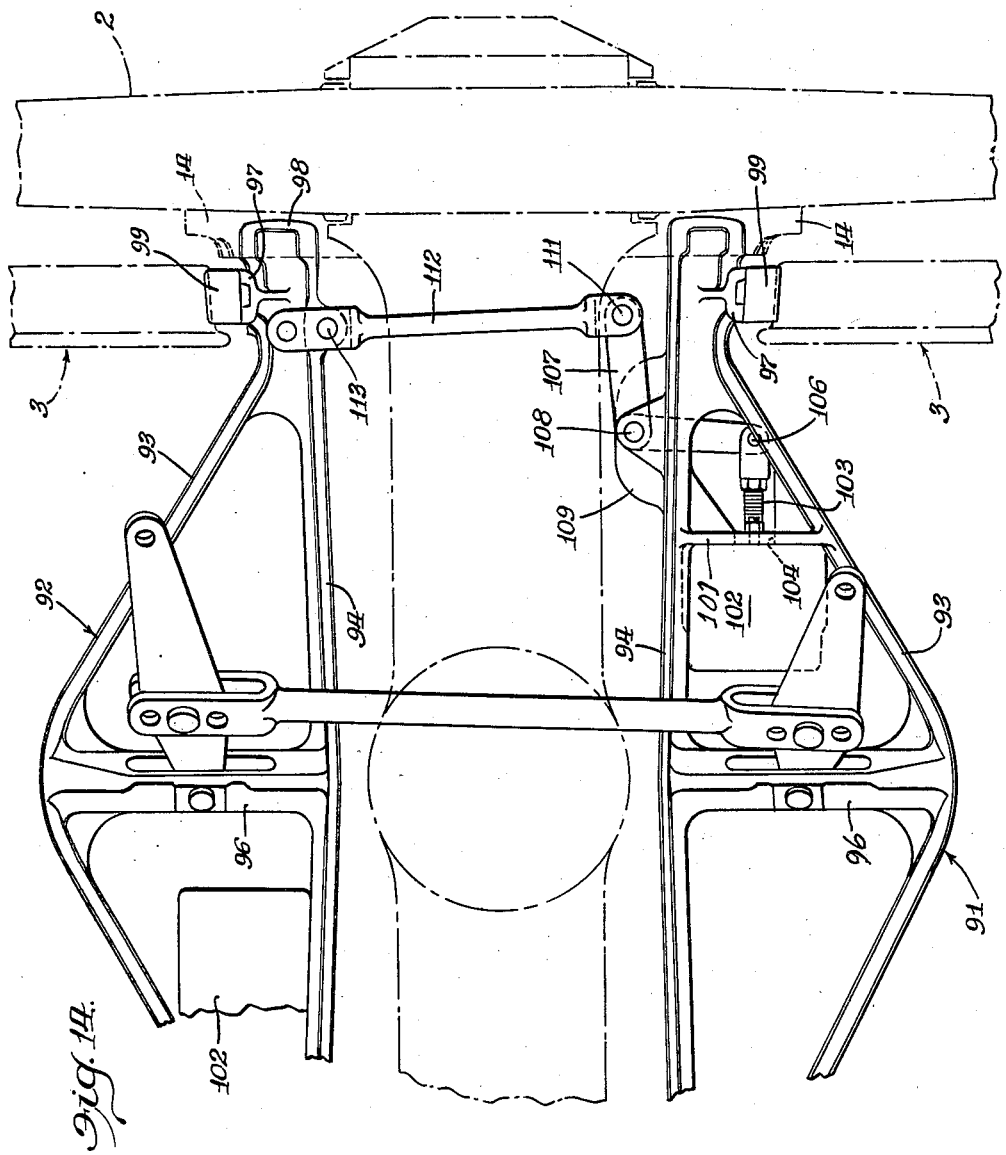

United States Patent Office 3,107,754
Patented Oct. 22, 1963

3,107,754
POWER BEAM TREAD BRAKE ARRANGEMENT
Fred E. Bachman, St. Louis, Mo., assignor to Amsted Industries Incorporated, Chicago, Ill., a corporation of New Jersey
Filed Oct. 19, 1961, Ser. No. 146,158
8 Claims. (Cl. 188—222.6)

This invention relates to brake rigging for railway cars and more particularly to a wheel tread brake rigging for use on a four wheel railway car truck.

Heretofore, tread brake rigging was designed for use to frictionally engage cast iron brake shoes against wheel treads. Due to the relatively low coefficient of friction of conventional cast iron brake shoes, it was necessary to design brake rigging adapted to exert a relatively high braking force to the shoes.

During recent years, composition brake shoes have been adapted for use on tread brake rigging provided on certain types of railway car trucks. As the coefficient of friction of a composition brake shoe is substantially higher than the coefficient of friction of a cast iron brake shoe, it will be appreciated that a composition brake shoe requires less braking force to decelerate a wheel and axle assembly.

It is, therefore, an object of the invention to provide a relatively light-weight tread brake rigging particularly adapted for use with composition brake shoes.

Another object of the invention resides in the provision of a tread brake rigging comprising two brake beams arranged on opposite sides of a bolster and provided adjacent their ends with brake shoes to frictionally engage their respective wheels of a four wheel railway car truck.

A further object of the invention resides in the provision of a tread brake rigging in which a power cylinder is mounted on each brake beam to act through a bell crank lever and connecting rod to move the brake beams apart toward their respective wheel and axle assemblies to engage the brake shoes against their respective wheel treads.

Another object of the invention resides in the provision of a tread brake rigging comprising identical cast metal brake beams having brake heads and guide lugs integral therewith, each beam embodying means adjacent one end thereof to enclose and support a power cylinder.

Another object of the invention is to provide a tread brake rigging embodying a relatively simple, inexpensive hand brake arrangement for actuating the brake beams.

The invention embodies other novel features, details of construction and arrangement of parts which are hereinafter set forth in the specification and claims and illustrated in the accompanying drawings, forming part thereof, wherein:

FIGURE 2 is a side elevation illustrating the truck structure shown in FIGURE 1;

FIGURE 3 is an end elevation showing the truck structure;

FIGURE 4 is a top plan view illustrating the brake beam;

FIGURE 5 is a front elevation of the brake beam;

Figure 10:
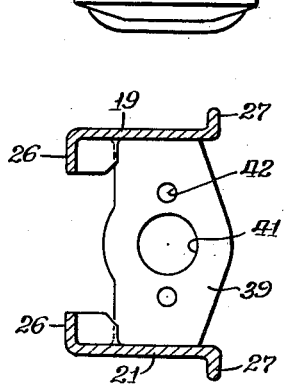
Figure 9:
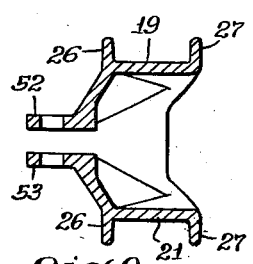

FIGURES 7 and 8 are transverse sections taken along the lines 7—7 and 8—8 of FIGURE 4;

FIGURES 9 and 10 are transverse sections taken along the lines 9—9 and 10—10 of FIGURE 5;

FIGURE 11 is a fragmentary plan view illustrating a modified form of the invention;

FIGURE 12 is a side elevation illustrating the structure shown in FIGURE 11;

FIGURE 13 is a transverse section taken along the line 13—13 of FIGURE 12;

FIGURE 14 is a fragmentary top plan view illustrating another embodiment of the invention.

Referring now to the drawings for a better understanding of the invention, the power beam tread brake arrangement is shown as applied to a four wheel railway car truck comprising side frames 2 supported at their ends upon wheel and axle assemblies 3 journaled in journal boxs 4 engaged between pedestal jaws 6. Each side frame is formed with tension and compression members 7 and 8 and spaced columns 9 defining an opening 11 to receive an end of a bolster 12 provided to inter-connect the side frames and to support a car body pivotally mounted thereon. The bolster is resiliently supported at its ends upon spring groups 13 seated on the tension member 7.

Each side frame 2 is provided on its inboard side and adjacent the lower ends of the columns with brake beam guide members 14 having slots 16 inclined upwardly toward the axis of rotation of their respective wheel and axle assemblies 3 to receive guide lugs 15 formed on the ends of brake beams 17 and 18. To facilitate and reduce the cost of manufacture, the brake beams 17 and 18 are preferably identical, each being in the form of a one-piece metal casting.

Each brake beam is shown as comprising vertically spaced upper and lower webs 19 and 21 converging at their ends and merging with longitudinally extending webs 22 and 23 which, in turn, merge at their outer ends with brake heads 24 and the guide lugs 15. A back reinforcing flange 26 extends along the webs 19, 21, 22 and 23 and merges at its ends with the guide lugs 15. A front reinforcing flange 27 extends along the webs 19, 21, 22 and 23 and merges at its ends with the brake heads 24. As illustrated in FIGURE 4, the back flange 26 is substantially straight, while the front flange 27 is curved to provide a brake beam of gradually decreasing width from its center toward its ends.

Each brake head 24 is shown as comprising an arcuate front wall 28 which merges with a vertical rear wall 29, the front flange 27, and its respective guide lug 15. Toe lugs 31 and 32 and spaced intermediate lugs 33 and 34 are formed on the front wall 28 to receive a brake shoe 36 adapted to be detachably connected to the lugs by a conventional key 37 which extends through slots 38 in the lugs.

A transverse wall 39 extends vertically between the upper and lower webs 19 and 21 of the brake beam and is formed with a central opening 41 and stud holes 42. A pneumatic power device 43 of the type now manufactured and sold by Bendix-Westinghouse Air Brake Company, under the trademark "Rotorchamber" is secured against the inboard side of the transverse wall 39 by means of studs and nuts 44. The power device comprises a flexible diaphragm 40 secured at its outer periphery to the cylinder 45 and secured at its inner periphery to piston 46 mounted on the inner end of a piston rod 47 which projects through the opening 41 and is pivotally connected to one arm 48 of a bell crank lever 49. A compression spring 51 is mounted in the cylinder 43 to yieldably resist movement of the piston 46.

The brake beam is formed with upper and lower bearing bosses 52 and 53 projecting toward each other from the upper and lower webs 19 and 21, respectively. The crank lever 49 is pivotally mounted between the houses 52 and 53 by means of a pivot pin 54. The other arm 56 of the bell crank lever 49 is pivotally connected at 57 to one end of a push rod 58 which is pivotally connected at 59 to a boss 61 formed on the companion brake beam.

It will be noted that the two brake beam assemblies thus shown and described are identical in construction to reduce the cost of manufacture and to facilitate replacement of parts.

Figure 1:
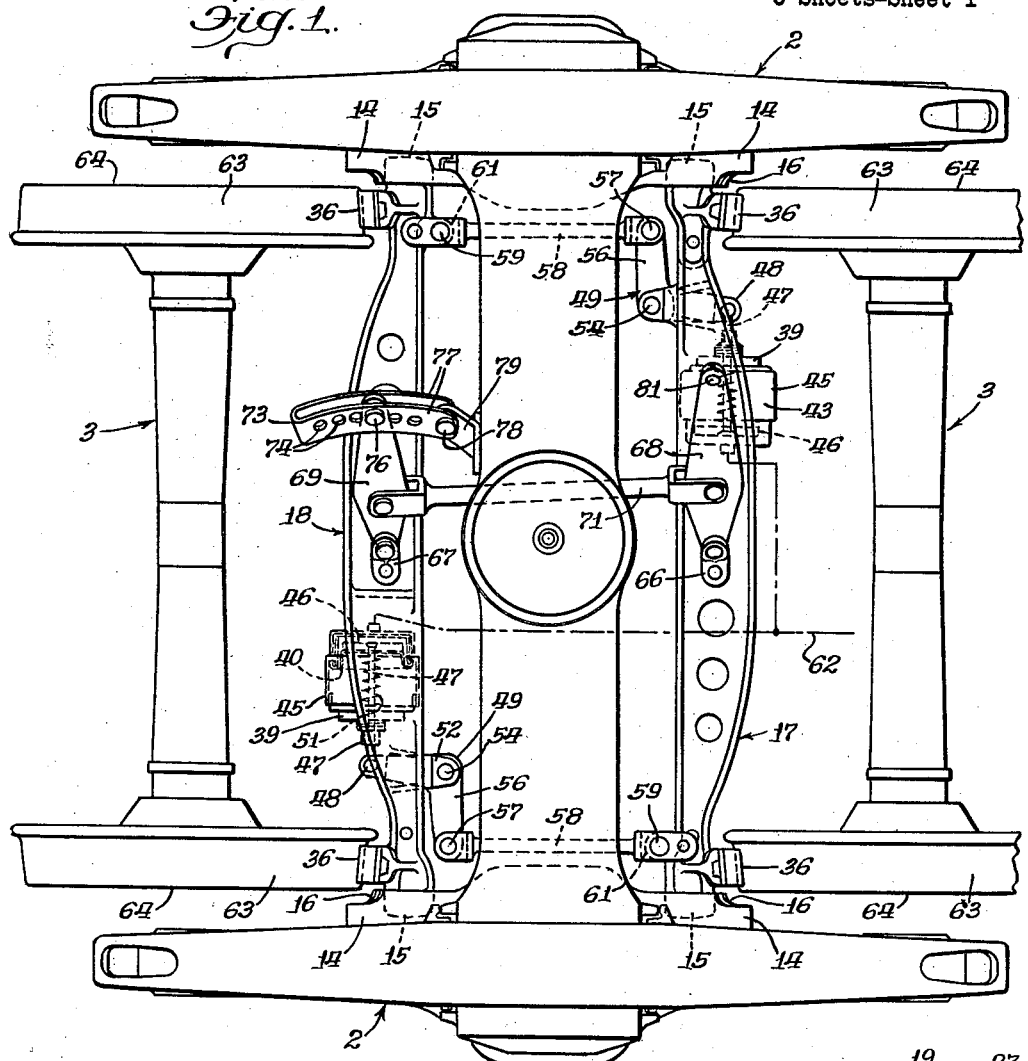
FIGURE 1 is a plan view illustrating a four wheel railway car truck provided with a power beam tread brake arrangement embodying features of the invention.
Figure 6:
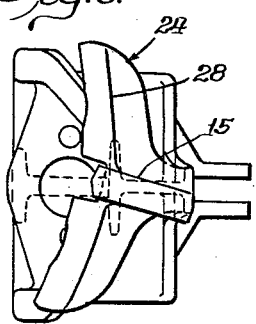
FIGURE 6 is an end elevation of the brake beam.

In operation, fluid under pressure is directed from a suitable source through a conduit 62 to the brake cylinders 43 to cause the piston rods 47 to pivot the bell crank levers 49 in a counterclockwise direction, as viewed in FIGURE 1. The levers 49 act through their respective push rods 58 to move the brake beams 17 and 18 toward their respective wheel and axle assemblies 3 to engage the brake shoes 36 against the tread surface 63 of their respective wheels 64. The brake beams 17 and 18 are moved toward each other to their retracted positions by means of the compression springs 51 provided in the cylinders 43 to engage and move their respective pistons 46 rearwardly upon a decrease in fluid pressure in the conduit 62.

The brake arrangement is provided with a hand brake rigging which is shown as comprising identical brackets 66 and 67 secured by rivets to the webs 22 of their respective brake beams 17 and 18. Brake levers 68 and 69 are pivotally connected to their respective brackets 66 and 67 and are connected to each other intermediate their ends by a connecting rod 71 which extends through an opening 72 in the bolster. The upper end of the brake lever 69 is pivotally connected to an adjustment link 73 formed with a plurality of holes 74 to receive a pivot pin 76.

The adjustment link 73 is shown as formed from a length of strip steel bent intermediate its ends to provide spaced parallel arms 77 to straddle the upper end of the lever 69. The ends of the arms 77 are pivotally connected at 78 to a bracket 79 secured to the bolster 12. The hand brake rigging is adapted to be actuated by a conventional manual operating means connected at 81 to the upper end of the brake lever 68.

FIGURES 11, 12 and 13 illustrate another embodiment of the invention in which the brake beam 81 is shown as comprising a flange 82 extending rearwardly from the vertical transverse wall 83 and extending between the upper and lower webs 84 and 86. Vertically spaced bosses 87 are formed on the flange 82 and project laterally toward the adjacent end of the beam. A bell crank lever 88 is disposed between the bosses 87 and pivotally connected thereto by a pivot pin 89, one arm of the lever being operatively connected to the power device 43 mounted on the wall 83. This embodiment of the invention is otherwise similar to the form heretofore shown and described.

FIGURE 14 illustrates another embodiment of the invention in which the brake arrangement is shown as comprising two truss type brake beams 91 and 92. Each brake beam is preferably in the form of a one-piece metal casting having tension and compression members 93 and 94 interconnected by a strut 96, said members converging toward and merging at their outer ends with brake heads 97 and guide lugs 98 having brake shoes 99 thereon to frictionally engage their respective wheels 64. The guide lugs 98 are slidably mounted on guide members 14 provided on the side frames 2 for radial movement toward the axes of rotation of their respective wheel and axle assemblies 3.

Each brake beam is provided with a vertical wall 101 extending transversely between the tension and compression members 93 and 94. A power device 102 is secured to the wall 101 of each brake beam between the tension and compression members and provided with a piston rod 103 which extends through an opening 104 in the wall. The piston rod 47 is pivotally connected at 106 to a bell crank lever 107 mounted at 108 for pivotal movement on a bracket 109 provided on the compression member 94. The lever 107 is pivotally connected at 111 to one end of a push rod 112 which is pivotally connected at 113 to the companion brake beam. This form of the invention is otherwise similar to the embodiments heretofore shown and described.

I claim:

1. A railway truck brake beam comprising upper and lower webs defining a transverse opening adjacent one end of the beam, coplanar webs merging with and interconnected by said upper and lower webs, front and rear reinforcing flanges extending along the front and rear edges of said webs and converging from the center of the beam toward the ends thereof.

2. A railway truck brake beam comprising upper and lower webs defining a tranverse opening adjacent one end of the beam, coplanar webs merging with and interconnected by said upper and lower webs, front and rear reinforcing flanges extending along the front and rear edges of said webs and converging from the center of the beam toward the ends thereof, and guide lugs on remote ends of said coplanar webs.

3. A railway truck brake beam comprising upper and lower webs defining a tranverse opening adjacent one end of the beam, coplanar webs merging with and interconnected by said upper and lower webs, front and rear reinforcing flanges extending along the front and rear edges of said webs and converging from the center of the beam toward the ends thereof, and brake heads projecting forwardly from remote ends of said coplanar webs.

4. A railway truck brake beam comprising upper and lower webs defining a transverse opening adjacent one end of the beam, coplanar webs merging with and interconnected by said upper and lower webs, front and rear reinforcing flanges extending along the front and rear edges of said webs and converging from the center of the beam toward the ends thereof, brake heads projecting forwardly from remote ends of said coplanar webs, and guide lugs projecting outwardly from remote ends of said coplanar webs.

5. A railway truck brake beam comprising upper and lower webs defining a tranverse opening adjacent one end of the beam, coplanar webs merging with and interconnected by said upper and lower webs, front and rear reinforcing flanges extending along the front and rear edges of said webs and converging from the center of the beam toward the ends thereof, and a vertical wall extending between said upper and lower webs adapted to support a power cylinder within said opening.

6. A railway truck brake beam comprising upper and lower webs defining a transverse opening adjacent one end of the beam, coplanar webs merging with and interconnected by said upper and lower webs, front and rear reinforcing flanges extending along the front and rear edges of said webs and converging from the center of the beam toward the ends thereof, and a vertical wall extending between said upper and lower webs adapted to support a power cylinder within said opening, and brake heads projecting forwardly from remote ends of said coplanar webs.

7. A railway truck brake beam comprising upper and lower webs defining a tranverse opening adjacent one end of the beam, coplanar webs merging with and interconnected by said upper and lower webs, front and rear reinforcing flanges extending along the front and rear edges of said webs and converging from the center of the beam toward the ends thereof, a vertical wall extending between said upper and lower webs adapted to support a power cylinder within said opening, brake heads projecting forwardly from remote ends of said coplanar webs, and guide lugs projecting outwardly from remote ends of said coplanar webs.

8. A railway truck brake beam comprising upper and lower webs defining a transverse opening adjacent one end of the beam, coplanar webs merging with and interconnected by said upper and lower webs, front and rear reinforcing flanges extending along the front and rear edges of said webs and converging from the center of the beam toward the ends thereof, a vertical wall extending between said upper and lower webs adapted to support a power cylinder within said opening, brake heads projecting forwardly from remote ends of said coplanar webs, guide lugs projecting outwardly from remote ends of said coplanar webs, and bearing bosses extending rearwardly from the beam adapted to support a bell crank lever within said opening.

References Cited in the file of this patent

UNITED STATES PATENTS

| | | |
|---|---|---|
| 838,776 | Crone | Dec. 18, 1906 |
| 2,058,119 | Widdicombe | Oct. 20, 1936 |

FOREIGN PATENTS

| | | |
|---|---|---|
| 820,778 | Great Britain | Sept. 23, 1959 |